United States Patent [19]

Chiba et al.

[11] 4,397,178
[45] Aug. 9, 1983

[54] FUEL ECONOMY RUNNING INDICATOR

[75] Inventors: Haruo Chiba, Ageo; Yukichi Sekiguchi, Saitama; Takashi Ohkubo, Omiya, all of Japan

[73] Assignee: Sanwa Seiki Manufacturing Co., Ltd., Saitama, Japan

[21] Appl. No.: 260,722

[22] Filed: May 5, 1981

[30] Foreign Application Priority Data

May 9, 1980 [JP] Japan .................................. 55-60664

[51] Int. Cl.³ .......................................... G01M 15/00
[52] U.S. Cl. ...................................... 73/114; 73/117.3
[58] Field of Search ....................... 73/114, 117.3, 116

[56] References Cited

U.S. PATENT DOCUMENTS 3,084,539  4/1963  Wentworth ............................ 73/114
4,173,887 11/1979  Fiala ..................................... 73/114

Primary Examiner—Jerry W. Myracle
Attorney, Agent, or Firm—Wenderoth, Lind & Ponack

[57] ABSTRACT

A fuel economy running indicator for an automobile, in particular, a truck with a Diesel engine, includes a characteristic converter for converting a first operating parameter of the engine to an output signal having a functional relationship with the first operating parameter, the functional relationship being such that the output signal represents a limited value in the scope which the first parameter has a relatively small value and the output signal always represents a zero value when the first parameter exceeds a predetermined value. The indicator also includes a comparator for comparing the output signal with a second operating parameter of the engine and for generating an output signal in response to the magnitude comparison thereof. The indicator further includes an indicator which operates in response to the output signal of the comparator for indicating whether or not the operation of the engine is within the scope of an economic fuel consumption rate.

6 Claims, 5 Drawing Figures

FUEL ECONOMY RUNNING INDICATOR

BACKGROUND OF THE INVENTION

This invention relates to a fuel economy running indicator which may be used during the driving operation of an automobile.

In general, an internal combustion engine for a vehicle is designed to have a scope for operating at a constant gear ratio of speed change gears even if the load of the vehicle changes considerably. Accordingly, it is possible that a driver selects the gear ratio within the scope of a certain degree to operate a vehicle, such as a truck, having a number of speed change gears.

However, under a constant power output, the internal combustion engine used for such a vehicle makes it possible to accomplish a satisfactory state of specific fuel consumption, that is, a fuel economy running state, by setting a suitable operation condition and, for this purpose, it is necessary to continually set a suitable gear ratio or proper travel of an accelerator pedal. This has become a substantial problem in this energy conserving age.

Prior to the disclosure of the present invention, the explanation relating to economic fuel consumption will be generally given hereinafter. FIG. 1 shows a general characteristic of a Diesel engine for vehicle wherein a vertical axis T indicates an output torque of the Diesel engine, a horizontal axis N indicates the speed thereof, and loop-like dashed lines e indicate equal fuel consumption curves. The specific fuel consumption increases gradually as the curves go outwardly. A dashed-line characteristic $a_1$ is at a constant travelling amount of an accelerator pedal and, in response to the travelling amount, is shifted along the vertical axis of FIG. 1, keeping substantially the shape of the characteristic $a_1$.

In an over-top change gear state (e.g., 6 speed change gears, differential gear ratio x over-top gear ratio=4.25) of a truck mounting the Diesel engine of FIG. 1 and a normal running state under a 100% load and 0% running grade conditions, a running resistance characteristic of the truck is shown as a dashed line i in FIG. 1.

If the truck runs at about 90 Km/h on an express highway, the speed of the Diesel engine comes up to No. If No is constant, it defines a border line c and the output torque T of the engine is given by an operating point f.

When the truck travelling with the running resistance as mentioned above runs on an express highway, as understood from FIG. 1, it is desirable to run at the engine speed approaching to the loop center of the equal fuel consumption curves e as closely as possible and, thus, it is desirable that the truck runs at 80-90 Km/h, that is, the speed thereof is limited below N=No.

In a running state, an automobile must be repeatedly accelerated and decelerated not only in the suburbs but in the town. In the acceleration state, the operating points of the engine exist in the upper area of the running resistance characteristic i.

As described above, in order to minimize the fuel cost in operation in consideration of a high vehicle speed as required on an express highway and a power enough to accelerate the vehicle, it is preferable to operate it within the area defined by border lines a, b and c.

Notably, the border line a indicates an equal travelling amount characteristic of the accelerator pedal which is maintained in the state getting close to the minimum fuel consumption, and this state satisfies a significant increase of the torque T which is required to increase a tractive force of the vehicle.

Also, the border line b means an operating state which is being accelerated from that of the increased tractive force, approaching the minimum fuel consumption as closely as possible, and indicates that, in the engine operation, it is desirable to reduce a travelling amount $a_1$ of the accelerator pedal, as the engine speed N increases.

Further, the border line c indicates the limited maximum speed of the vehicle and also indicates that it is possible that No gets close to the area of the minimum fuel consumption, if the maximum speed of the vehicle is permitted to be relatively lowered, such as during the running in the town.

SUMMARY OF THE INVENTION

An object of the present invention is to provide a novel fuel economy running indicator.

Another object of the present invention is to provide a fuel economy running indicator indicating whether a combination of an accelerator pedal travelling amount determining the power output state of an internal combustion engine and a gear ratio of speed change gears, which are selected from some operating parameters varied by a driver, is within the scope of an economy fuel consumption.

Still another object of the present invention is to provide a fuel economy running indicator indicating that the automobile truck is operated within the area defined by the border lines a, b and c as shown in FIG. 1.

These and other objects and features of the present invention will be better understood from the following description taken in conjunction with the accompanying drawings.

DESCRIPTION OF THE PREFERRED EMBODIMENT

Figure 2:
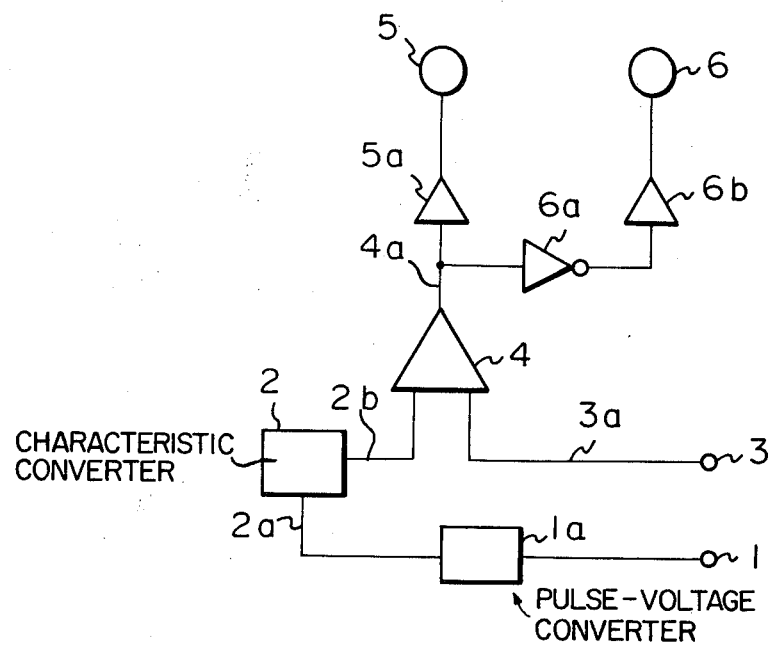
FIG. 2 shows a block diagram embodying the fuel economy running indicator of the present invention.
Figure 3:
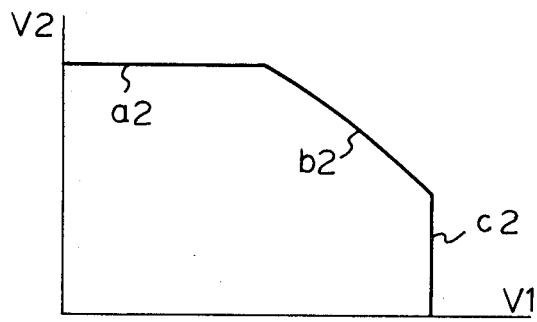
FIG. 3 shows the functional relationship between the input voltage $V_1$ and the output voltage $V_2$ of a characteristic converter 2 as shown in FIG. 2.

FIG. 2 shows one embodiment of the present invention. A voltage at the neutral point of an AC generator is applied to an input terminal 1. The AC generator may be mounted on a Diesel engine of a truck and driven by the engine. A pulse-voltage converter 1a converts AC pulse signals at the input terminal 1 to a voltage level signal. A characteristic converter 2 converts an input voltage $V_1$, which has output from the pulse-voltage converter 1a, to an output voltage $V_2$ as shown in FIG. 3. A voltage signal proportional to a travelling amount of an accelerator pedal with the Diesel engine is applied to a further input terminal 3. Leads 2b and 3a are respectively connected to first and second inputs of a comparator 4.

An output lead 4a of the comparator 4 is connected to a green lamp 5 through an amplifier 5a and is also connected to a red lamp 6 through an inverter 6a and an amplifier 6b.

The operation of the construction as described above will now be described. The AC generator of the engine outputs a plurality of pulse signals proportional to the engine speed, which are applied to the input terminal 1, and the pulse signals are converted to a voltage level proportional to the number thereof. Thus, the voltage level on the lead 2a corresponds to the engine speed. The characteristic converter 2 produces the relationship between the input voltage $V_1$ on the lead 2a and the output voltage $V_2$ on the lead 2b, as shown in FIG. 2. The converted voltage value is compared with a voltage value corresponding to an accelerator pedal travelling amount, which is inputted through the lead 3a, by the comparator 4 which outputs a voltage signal on a lead 4a when the voltage value on the lead 2b becomes larger than that on the lead 3a.

In the operation of the comparator 4, the output voltage $V_2$ presents a constant value to the extent of which the input voltage $V_1$ corresponds to a low engine speed characteristic $a_2$ as shown in FIG. 3. In this characteristic $a_2$, when the voltage on the lead 3a corresponding to an accelerator pedal travelling amount is smaller than the output voltage $V_2$ corresponding to the characteristic $a_2$, the comparator 4 generates a voltage at the output thereof. This state presents that, in FIG. 1, the operating points of the engine exist in the area below the border line a.

Figure 1:
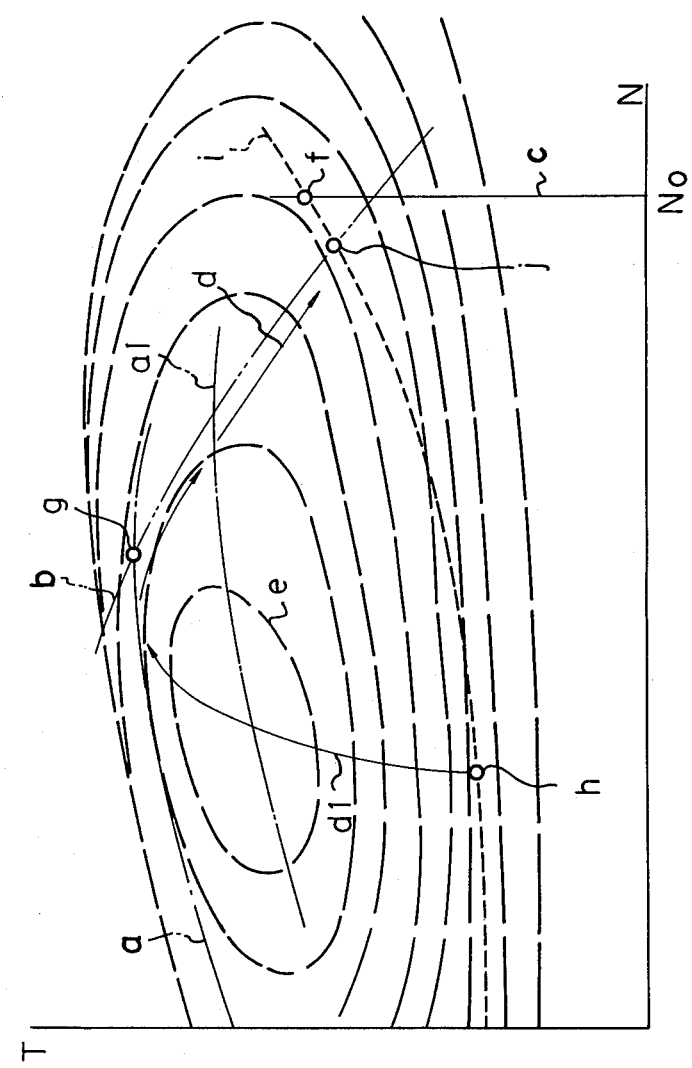
FIG. 1 shows equal fuel consumption curves (dashed lines e) and operating characteristics of a Diesel engine which may be used for the present invention.

Similarly, a characteristic $b_2$ in FIG. 3 corresponds to the border line b in FIG. 1 and, in the extent of $b_2$, the comparator 4 outputs a voltage signal on the line 4a when the voltage value on the lead 2a in FIG. 2 becomes larger than that on the lead 3a. This state represents that, in FIG. 1, the operating points are below the border line b.

Also, a characteristic $c_2$ in FIG. 3 corresponds to the border line c in FIG. 1 and this shows that the voltage on the lead 2b always becomes a zero value when the engine speed N exceeds No. Accordingly, while the accelerator pedal is pushed down at the engine speed N exceeding No, the voltage value on the lead 3a is above zero on the lead 2b and, therefore, there is no voltage signal at the output of the comparator 4.

According to the operation above, when the voltage signal is outputted to the lead 4a, the signal is amplified by the amplifier 5a and then the amplified signal illuminates the lamp 5. However, the lamp 6 is not energized because of the inverter 6a which is inserted between the lamp 6 and the comparator 4.

Alternatively, when the voltage does not appear on the lead 4a, the lamp 5 is not energized while the signal is applied to the amplifier 6b because of the inverter 6a and then the amplified signal illuminates the lamp 6.

In this way, the fuel economy running indicator as shown in FIG. 2 is constructed such that the green lamp 5 is illuminated when the operating points of the engine are within the scope of an economic fuel consumption state defined by the border lines a, b and c in FIG. 1, and the red lamp 6 is illuminated when the operating points of the engine exist in the outside of the border lines a, b, and c.

The vehicle will be operated by using the fuel economy running indicator in FIG. 2 in the following manner.

As described above, in general, the driver of an automobile must continuously accelerate and decelerate, while watching obstacles in the forward direction. Illustrating the decelerating through accelerating states in relation to FIG. 1, the operating point of the engine is a point h on the running resistance characteristic i when the vehicle speed is in a normal state after deceleration.

If the accelerator pedal is further pushed down at the normal state, the engine is accelerated and, therefore, the vehicle is also accelerated. When an accelerator pedal travelling amount reaches the border line a, the red lamp 6 illuminates to warn the operator, as described in relation to FIG. 2. If the operator releases slightly the accelerator pedal in obedience to the warning indication, the red lamp 6 turns off and the green lamp 5 turns on. Subsequently, if this pedal position is maintained as it is, the engine speed N increases gradually along the border line a and then exceeds the border line b to thereby turn on the red lamp 6. Thus, the operator again releases the accelerator pedal by degrees until the red lamp 6 turns off.

This state is continued until the operating point of the engine follows the course from an arrow $d_1$ to d and reaches a normal operating state point j on the running resistance characteristic i.

In the illustration above, since the weight of both the lead and the body itself of the truck is relatively heavy, the arrows $d_1$ and d change greatly in comparison with these of an automobile for riding. The operator, therefore, may have enough scope to control the travelling of the accelerator pedal, while paying attention to the indication of the lamps 5 and 6.

This, of course, can be applied not only to a truck but also to a vehicle, such as a bus, used for carrying a number of passengers, and may also be applied to a general automobile for riding.

In contrast to the accelerating operation as described above, the running resistance characteristic in the running of climbing of the vehicle is upwardly shifted in FIG. 1. The acceleration at climbing requires a change gear having a relatively low gear ratio to the over-top gear ratio as noted above and, in response to the selection of such a gear ratio, the operating scope is changed. However, since any operating point is indicated by the illumination of either the lamp 5 or 6, it is possible that the operator selects an efficient gear ratio as desired.

The characteristic converter 2 in FIG. 2 converts the input voltage $V_1$ corresponding to the engine speed to the output voltage $V_2$, as shown in FIG. 3. The comparator 4 compares the output voltage $V_2$ with the voltage value corresponding to a travelling amount of the accelerator pedal. In this operation, the characteristic of the border lines a, b and c in FIG. 1 is presented as a function of the engine speed N and the presented reference output voltage is compared with a function of the accelerator pedal travelling amount. However, it is apparent that the border lines a, b and c may be presented as a function of the travelling amount and the presented reference output voltage is compared with a function of the true engine speed N.

Figure 4:
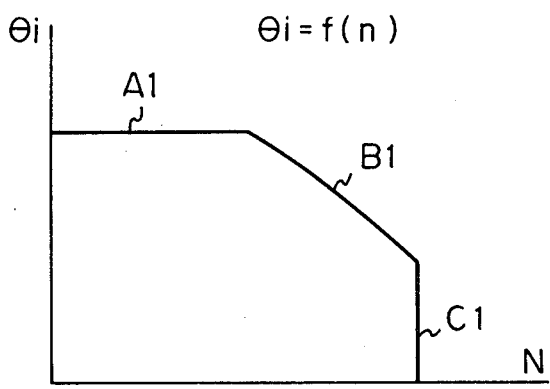
FIG. 4 shows an accelerator pedal travelling amount $\theta_i$ which is given as a function of a true engine speed N, where the border lines a, b and c are presented by the travelling amount.

In other words, if the characteristic of FIG. 3 is presented by the true engine speed (corresponding to $V_1$) and the accelerator pedal travelling amount (corresponding to $V_2$), the relationship, $\theta i = f(n)$, presents a characteristic, as shown in FIG. 4, which is analogous to that of FIG. 3. The characteristic of FIG. 4 means that the characteristic of the border lines a, b and c in FIG. 1 is presented as a function of both the accelerator pedal travelling amount $\theta i$ and the true engine speed N, and furthermore the travelling amount $\theta i$ is presented as a function, $f(n)$, of the engine speed N.

Figure 5:
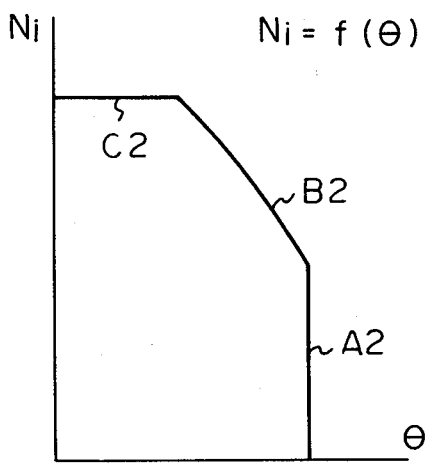
FIG. 5 shows an engine speed Ni which is given as a function of a true accelerator pedal travelling amount $\theta$, where the border lines a, b and c are presented by the engine speed.

Alternatively, this means that an engine speed Ni (reference value) on the border lines a, b and c in FIG. 1 may be presented as a function, $f(\theta)$, of the accelerator pedal travelling amount, the characteristic being such as that shown in FIG. 5, as understood from FIG. 1, and the border lines $A_1$, $B_1$ and $C_1$ in FIG. 4 and the lines $A_2$, $B_2$ and $C_2$ in FIG. 5 respectively correspond to the lines a, b and c.

In this way, regarding the characteristic conversion as shown in FIG. 5, one detected signal, $\theta$, is inputted to the terminal 1, in FIG. 2, and another detected signal, the engine speed N, is inputted to the terminal 3. The characteristic converter 2 has the characteristic as shown in FIG. 5, that is, the input $\theta$-output Ni characteristic.

Explaining the operation of this case, a reference output on the lead $2b$ is a high constant output voltage corresponding to the characteristic $C_2$, as shown in FIG. 5, which shows the scope representing a small amount of travelling of the accelerator pedal. When a detected signal at one terminal of the comparator, representing the engine speed, is larger than the signal at the other input of the comparator 4, representing the amount of travelling the red lamp 6 turns on and this indicates that the engine speed N in FIG. 1 is larger than No. In the scope in which the travelling amount corresponds to the characteristic $B_2$, the output signal on the lead $2b$ represents a reduced voltage value as the travelling amount $\theta$ increases and, when the output voltage is higher than a voltage value on the lead $3a$, the red lamp 6 illuminates. When an amount of travelling the accelerator pedal, $\theta$, exceeds the characteristic $A_2$, the output voltage on the lead $2b$, corresponding to a reference engine speed Ni, always becomes a zero value and, thus, the voltage value on the lead $3a$ is larger than the value on the lead $2b$ to thereby turn on the red lamp.

Consequently, it is apparent that the comparator 4 may compare an engine speed and an amount of travelling the accelerator pedal, one of which has been characteristic-converted.

As understood from the explanation above, the fuel economy running indicator of the present invention functions to illuminate a lamp for warning an operator when an engine operating state intends to go out of the border lines a, b and c in FIG. 1. In obedience to such warning indication, the driver can continuously control the engine such that the engine is operated within the area defined by the lines and, thus, the vehicle is permitted to repeat the accelerating operation, approaching the minimum fuel consumption rate as closely as possible. Accordingly, it is possible to reduce the fuel consumption within the limits of possibility, effecting the high-speed running required of an automobile and the repetition of the accelerating and decelerating operations. Further, since it is easy to change an amount of travelling of the accelerator pedal by merely judging the illumination of one of the green lamp 5 and the red lamp 6, the driver is not required to have any new operating techniques in addition to a conventional techniques. Still further, since the present invention is constructed by a very simple circuit such that the output signal of the characteristic converter 2 is compared with a detected signal other than the detected signal input to the converter 2, the unit cost of production is reduced.

Additionally, according to the fuel economy running indicator of the present invention, it is possible to detect the engine speed at the neutral point of the A.C. generator without using an expensive device, such as an electromagnetic pickup. Therefore, the mounting cost of the overall system is economical.

What is claimed is:

1. A fuel economy running indicator of an internal combustion engine comprising:
   a characteristic convertor for converting a first operating parameter of the engine to an output signal having a functional relationship with the first operating parameter, said functional relationship being such that said output signal represents a limited value in the scope which said first parameter has a relatively small value and the output signal always represents a zero value when said first parameter exceeds a predetermined value;
   a comparator for comparing said output signal with a second operating parameter of the engine and for generating an output signal in response to the magnitude comparison thereof, and
   an indicating means which operates in response to the output signal of said comparator for indicating whether or not the operation of the engine is within the scope of an economic fuel consumption rate.

2. The indicator as set forth in claim 1, wherein said first operating parameter is one of a first detected signal representing an engine speed of the engine and a second detected signal representing an amount of travelling of an accelerator pedal, and said second operating parameter is the other thereof.

3. The indicator as set forth in claim 2, wherein said limited value in the scope which said first parameter has a relatively small value is given by a predetermined characteristic in relation to equal fuel consumption curves inherent in said engine.

4. The indicator as set forth in claim 1, wherein said limited value in the scope which said first parameter has a relatively small value is given by a predetermined characteristic in relation to equal fuel consumption curves inherent in said engine.

5. The indicator as set forth in claim 1, wherein said predetermined value is a maximum vehicle speed in the economic fuel consumption state inherent in said engine.

6. The indicator as set forth in any one of claims 1 to 5 or 3, wherein said engine is a Diesel engine for a truck.

* * * * *